(12) United States Patent
Imoto et al.

(10) Patent No.: US 12,181,868 B2
(45) Date of Patent: Dec. 31, 2024

(54) INFORMATION COLLECTION DEVICE, INFORMATION COLLECTION METHOD, AND INFORMATION COLLECTION PROGRAM

(71) Applicant: TOYOTA JIDOSHA KABUSHIKI KAISHA, Toyota Aichi-ken (JP)

(72) Inventors: Masayuki Imoto, Susono Shizuoka-ken (JP); Jun Miyagawa, Numazu Shizuoka-ken (JP); Yasue Mano, Numazu Shizuoka-ken (JP); Ayako Nakamura, Sunto-gun Shizuoka-ken (JP); Naohiro Seo, Sunto-gun Shizuoka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 375 days.

(21) Appl. No.: 17/722,679

(22) Filed: Apr. 18, 2022

(65) Prior Publication Data

US 2022/0404826 A1 Dec. 22, 2022

(30) Foreign Application Priority Data

Jun. 21, 2021 (JP) ................................. 2021-102613

(51) Int. Cl.
| | |
|---|---|
| *G05D 1/00* | (2024.01) |
| *B64C 39/02* | (2023.01) |
| *H04B 7/185* | (2006.01) |
| *B64U 101/20* | (2023.01) |
| *B64U 101/30* | (2023.01) |

(52) U.S. Cl.
CPC ....... *G05D 1/0022* (2013.01); *H04B 7/18506* (2013.01); *B64U 2101/20* (2023.01); *B64U 2101/30* (2023.01); *B64U 2201/20* (2023.01)

(58) Field of Classification Search
CPC . G05D 1/0022; B64C 39/024; H04B 7/18506
See application file for complete search history.

(56) References Cited

U.S. PATENT DOCUMENTS 10,137,984 B1 * 11/2018 Flick ...................... G06V 20/13
10,467,885 B2 * 11/2019 Trundle ................. B64D 47/04
(Continued)

FOREIGN PATENT DOCUMENTS

| JP | 2017-120534 A | 7/2017 |
|---|---|---|
| JP | 2017-130135 A | 7/2017 |

(Continued)

*Primary Examiner* — Mussa A Shaawat
(74) *Attorney, Agent, or Firm* — Dinsmore & Shohl LLP (57) ABSTRACT

An information collection device according to the present disclosure is an information collection device that causes a small unmanned aerial vehicle to fly from a departure point to a destination and collects information at the destination using the small unmanned aerial vehicle, and includes a control device that causes the small unmanned aerial vehicle to fly from the departure point to the destination by transmitting a control signal to the small unmanned aerial vehicle by wireless information communication via a vehicle when determination is made that the wireless information communication is able to be executed with the small unmanned aerial vehicle via the vehicle located between the departure point and the destination.

17 Claims, 5 Drawing Sheets

(56) References Cited

U.S. PATENT DOCUMENTS

| | | | |
|---|---|---|---|
| 10,837,782 B1* | 11/2020 | Rezvani | G06Q 50/16 |
| 2017/0238234 A1* | 8/2017 | Dowlatkhah | H04B 7/18504 |
| | | | 455/517 |
| 2017/0341745 A1 | 11/2017 | Sekine et al. | |
| 2019/0265707 A1* | 8/2019 | Cantrell | G05D 1/101 |
| 2019/0369613 A1* | 12/2019 | Moon | G05D 1/101 |
| 2020/0115048 A1 | 4/2020 | Sugimura et al. | |
| 2020/0346751 A1* | 11/2020 | Horelik | G05D 1/101 |
| 2020/0377211 A1* | 12/2020 | Daddi | A01C 7/00 |
| 2021/0063120 A1* | 3/2021 | Taveniku | G06V 40/172 |
| 2021/0088337 A1* | 3/2021 | Koubaa | G01C 21/20 |
| 2021/0263537 A1* | 8/2021 | Belt | B64C 39/024 |
| 2021/0403157 A1* | 12/2021 | Thompson | G05D 1/0027 |
| 2022/0024577 A1* | 1/2022 | Stamatovski | G06V 10/143 |
| 2022/0063689 A1* | 3/2022 | Kumar | H04N 23/661 |
| 2022/0066478 A1* | 3/2022 | Kunwar | G05D 1/1062 |
| 2022/0067337 A1* | 3/2022 | Rezvani | G06V 20/17 |
| 2022/0113421 A1* | 4/2022 | Xu | G01S 7/4808 |
| 2022/0215763 A1 | 7/2022 | Matsuki et al. | |
| 2023/0131370 A1* | 4/2023 | Gorski | A01K 29/005 |
| | | | 340/573.1 |

FOREIGN PATENT DOCUMENTS

| | | | |
|---|---|---|---|
| JP | 2017-213951 A | 12/2017 | |
| JP | 2018-181285 A | 11/2018 | |
| JP | 2020-059470 A | 4/2020 | |
| JP | 6883155 B1 | 6/2021 | |

* cited by examiner

INFORMATION COLLECTION DEVICE, INFORMATION COLLECTION METHOD, AND INFORMATION COLLECTION PROGRAM

CROSS-REFERENCE TO RELATED APPLICATION

This application claims priority to Japanese Patent Application No. 2021-102613 filed on Jun. 21, 2021, incorporated herein by reference in its entirety.

BACKGROUND

1. Technical Field

The present disclosure relates to an information collection device, an information collection method, and an information collection program.

2. Description of Related Art

Japanese Unexamined Patent Application Publication No. 2018-181285 (JP 2018-181285 A) describes a system in which a drone flies from a base to a fire occurrence site, captures a video of the fire occurrence site from the sky, and transmits the video to a fire station or the like.

SUMMARY

When there is no wireless information communication network that covers a range from a departure point to a destination such as a fire occurrence site, information communication with the drone cannot be performed, so that information on the destination cannot be collected using the drone. Therefore, it has been expected to provide a technology capable of collecting the information on the destination using the drone even when there is no wireless information communication network that covers the range from the departure point to the destination.

The present disclosure has been made in view of the above, and an object of the present disclosure is to provide an information collection device, an information collection method, and an information collection program capable of collecting the information on the destination using a small unmanned aerial vehicle even when there is no wireless information communication network that covers the range from the departure point to the destination.

An information collection device according to the present disclosure is an information collection device that causes a small unmanned aerial vehicle to fly from a departure point to a destination and collects information at the destination using the small unmanned aerial vehicle. The information collection device includes a control device that causes the small unmanned aerial vehicle to fly from the departure point to the destination by transmitting a control signal to the small unmanned aerial vehicle by wireless information communication via a vehicle located between the departure point and the destination when the wireless information communication is able to be executed with the small unmanned aerial vehicle via the vehicle.

An information collection method according to the present disclosure is an information collection method that causes a small unmanned aerial vehicle to fly from a departure point to a destination and collects information at the destination using the small unmanned aerial vehicle. The information collection method includes a step of causing the small unmanned aerial vehicle to fly from the departure point to the destination by transmitting a control signal to the small unmanned aerial vehicle by wireless information communication via a vehicle located between the departure point and the destination when the wireless information communication is able to be executed with the small unmanned aerial vehicle via the vehicle.

An information collection program according to the present disclosure is an information collection program that causes a processor to execute a process of causing a small unmanned aerial vehicle to fly from a departure point to a destination and collecting information at the destination using the small unmanned aerial vehicle. The information collection program causes the processor to execute a process of causing the small unmanned aerial vehicle to fly from the departure point to the destination by transmitting a control signal to the small unmanned aerial vehicle by wireless information communication via a vehicle located between the departure point and the destination when the wireless information communication is able to be executed with the small unmanned aerial vehicle via the vehicle.

With the information collection device, the information collection method, and the information collection program according to the present disclosure, even when there is no wireless information communication network that covers the range from the departure point to the destination, information on the destination can be collected using the small unmanned aerial vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an information providing system according to one embodiment of the present disclosure will be described in detail with reference to the drawings.

Configuration

Figure 2:
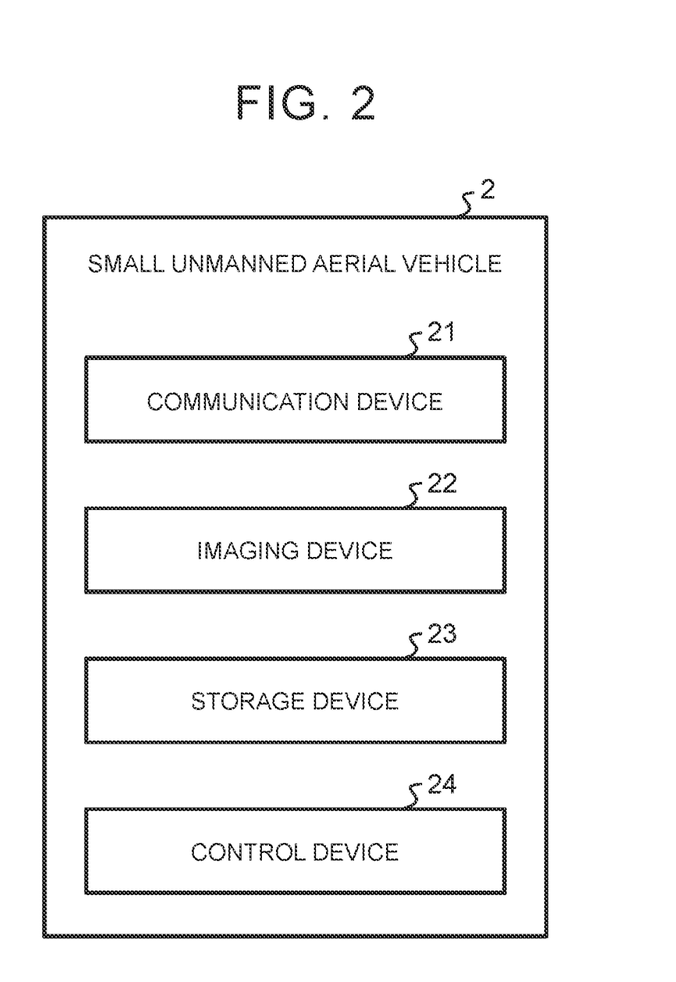
FIG. 2 is a block diagram showing a configuration of a small unmanned aerial vehicle shown in FIG. 1.
Figure 3:
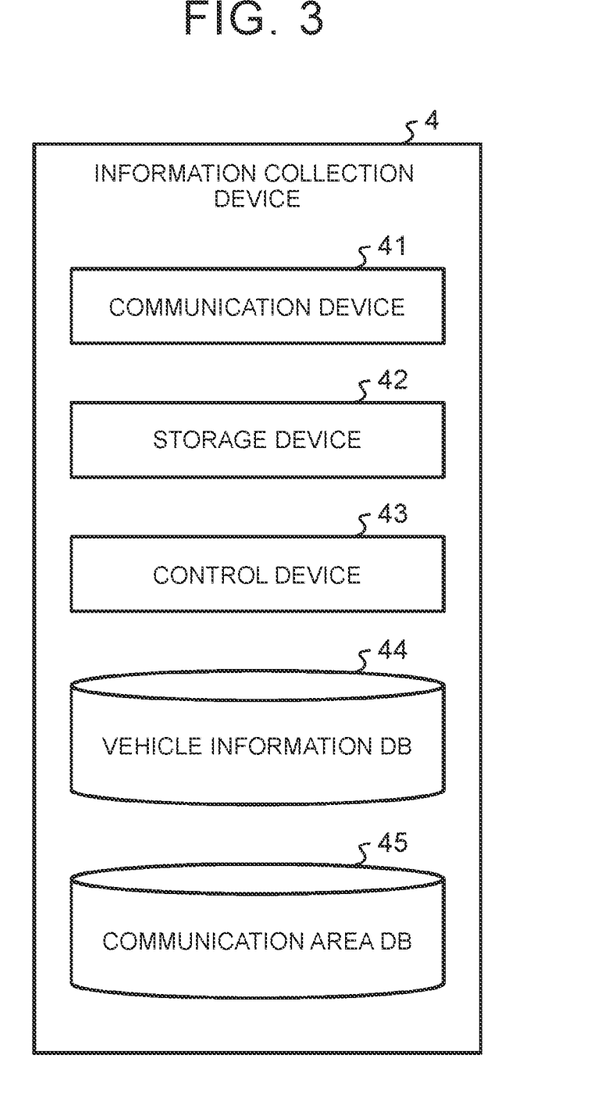
FIG. 3 is a block diagram showing a configuration of an information collection device shown in FIG. 1.

First, a configuration of the information providing system according to the one embodiment of the present disclosure will be described with reference to FIGS. 1 to 3.

Figure 1:
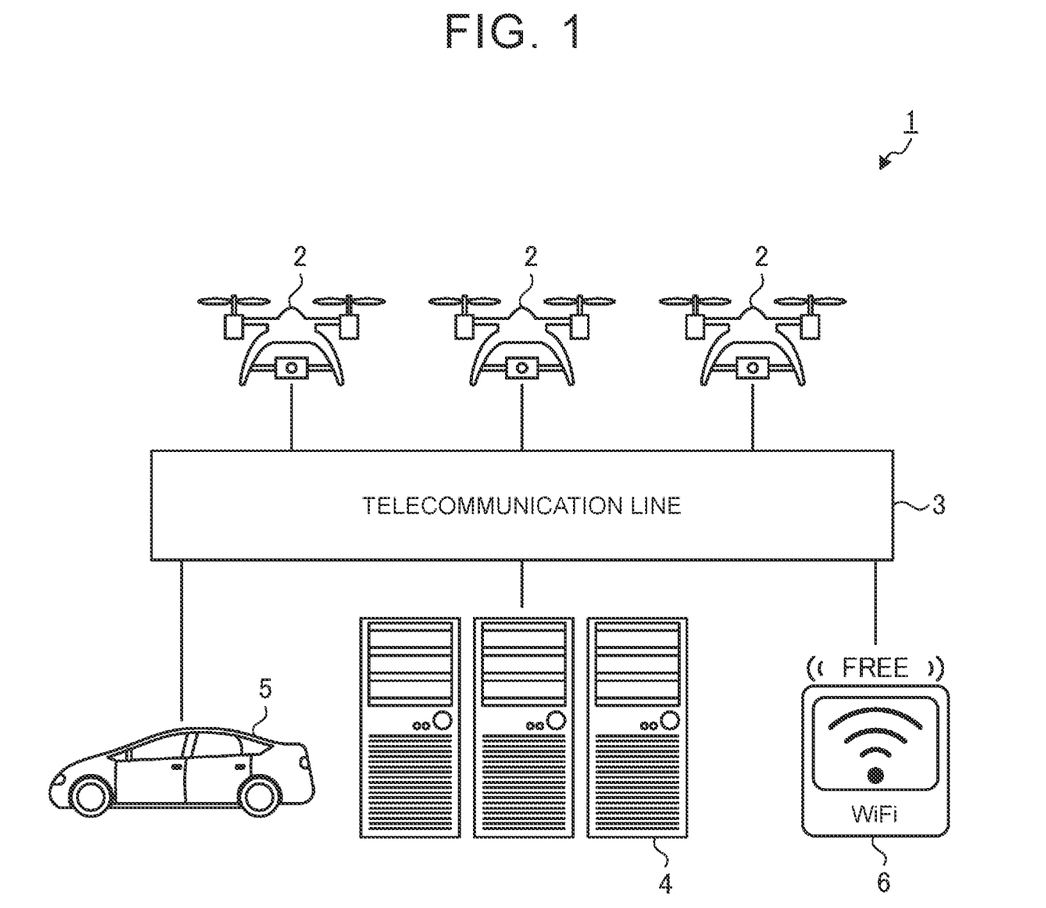
FIG. 1 is a schematic diagram showing a configuration of an information providing system according to one embodiment of the present disclosure.

FIG. 1 is a diagram showing the configuration of the information providing system according to the one embodiment of the present disclosure. As shown in FIG. 1, an information providing system 1 according to the one embodiment of the present disclosure is a system for providing information on a destination such as a disaster occurrence site collected using a small unmanned aerial vehicle 2 such as a drone via a telecommunication line 3 such as the Internet network and a mobile phone network, and includes the small unmanned aerial vehicle 2, an information collection device 4, and a vehicle 5 as main components.

The small unmanned aerial vehicle 2 is a device for flying from a departure point such as a base station to the destination in accordance with a control signal transmitted from the information collection device 4 via the telecommunication line 3, the vehicle 5, and a wireless information communication network 6 such as household WiFi (registered trademark), collecting various types of information on the destination from the sky above the destination, and transmitting the collected information to the information collection device 4. When the destination is a disaster occurrence site, video information on the disaster occurrence site and a victim can be exemplified as the information collected by the small unmanned aerial vehicle 2. As shown in FIG. 2, the small unmanned aerial vehicle 2 includes a communication device 21, an imaging device 22, a storage device 23, and a control device 24.

The communication device 21 is composed of a communication circuit for information communication via the telecommunication line 3, the vehicle 5, and the wireless information communication network 6, and controls information communication between the information collection device 4 and the vehicle 5. Specifically, the communication device 21 modulates a signal to be transmitted in a frequency band of the communication line to which the signal is transmitted and transmits the signal, and demodulates the signal upon receiving a signal in the frequency band of the communication line.

The imaging device 22 is composed of an imaging device including a charge coupled device (CCD) image sensor in which one or more lenses and a lens capture an image of a subject on which a ray of light is focused, and a complementary metal oxide semiconductor (CMOS) image sensor. The imaging device 22 captures a video of the destination from the sky above the destination and transmits the video to the information collection device 4 in accordance with a control signal transmitted from the information collection device 4 via the telecommunication line 3, the vehicle 5, and the wireless information communication network 6, or stores image data in the storage device 23.

The storage device 23 is composed of a hard disk drive (HDD), a solid state drive (SSD), a dynamic random access memory (DRAM), a read only memory (ROM), a recording medium, and the like. The storage device 23 stores various types of information collected at the destination, such as the image data of the imaging device 22. The small unmanned aerial vehicle 2 does not have to include the storage device 23.

The control device 24 is composed of a processor that is provided with a central processing unit (CPU), a digital signal processor (DSP), a field-programmable gate array (FPGA), etc., a temporary storage unit that is provided with a random access memory (RAM), etc., and a main storage unit that is provided with a read-only memory (ROM), etc. The control device 24 loads a computer program stored in the main storage unit into the temporary storage unit, and controls each unit of the small unmanned aerial vehicle 2 by executing the loaded computer program.

The information collection device 4 is composed of an information processing device such as a workstation, and distributes information on the destination collected using the small unmanned aerial vehicle 2 via the telecommunication line 3. As shown in FIG. 3, the information collection device 4 includes a communication device 41, a storage device 42, a control device 43, a vehicle information database (vehicle information DB) 44, and a communication area database (communication area DB) 45.

The communication device 41 is composed of a communication circuit similar to the communication device 21 of the small unmanned aerial vehicle 2, and controls information communication between the small unmanned aerial vehicle 2, the vehicle 5, and the wireless information communication network 6.

The storage device 42 is composed of a storage device similar to the storage device 23 of the small unmanned aerial vehicle 2, and stores information on the destination collected using the small unmanned aerial vehicle 2.

The control device 43 is composed of a control device similar to the control device 24 of the small unmanned aerial vehicle 2. The control device 43 loads a computer program stored in the main storage unit into the temporary storage unit, and controls each unit of the information collection device 4 by executing the loaded computer program. The computer program may be stored and provided as file data in an installable format or an executable format in a computer-readable storage medium such as a compact disc (CD)-ROM, a flexible disk (FD), a compact disc-recordable (CD-R), a digital versatile disk (DVD), universal serial bus (USB) media, or flash memory. Further, the computer program may be configured to be stored in a computer connected to the telecommunication line and provided by downloading via the telecommunication line.

The vehicle information DB 44 stores information related to identification information, position information, and the like of the vehicle 5 capable of executing information communication. The information stored in the vehicle information DB 44 is updated to the latest state at predetermined control cycles.

The communication area DB 45 stores identification information (service set identifier (SSID), encryption key, etc.) of the available wireless information communication network 6, information on a communicable area, and the like. The information stored in the communication area DB 45 is updated to the latest state at predetermined control cycles.

The vehicle 5 is composed of a well-known vehicle such as an electrified vehicle (EV), a hybrid electric vehicle (HEV), and a fuel cell electric vehicle (FCEV), and can execute information communication processing via the telecommunication line 3 and the wireless information communication network 6, vehicle-to-vehicle communication, and road-to-vehicle communication. Further, the vehicle 5 has a short-range wireless communication function conforming to standards such as near field radio communication (NFC), Bluetooth (registered trademark) low energy (BLE), and infrared data association (IrDA), and can execute information communication using the short-range wireless communication function. Further, the vehicle 5 has a position information acquisition function, acquires own position information at predetermined control cycles, and transmits the information to the information collection device 4.

In the information providing system 1 including such a configuration, the information collection device 4 executes the following information collection processing, so that even though there is no wireless information communication network that covers the range from the departure point to the destination due to factors such as a disaster, the information on the destination is collected using the small unmanned aerial vehicle 2. Hereinafter, the operation of the information collection device 4 when executing the information collection processing will be described with reference to the flowchart shown in FIG. 4.

Information Collection Processing

Figure 4:
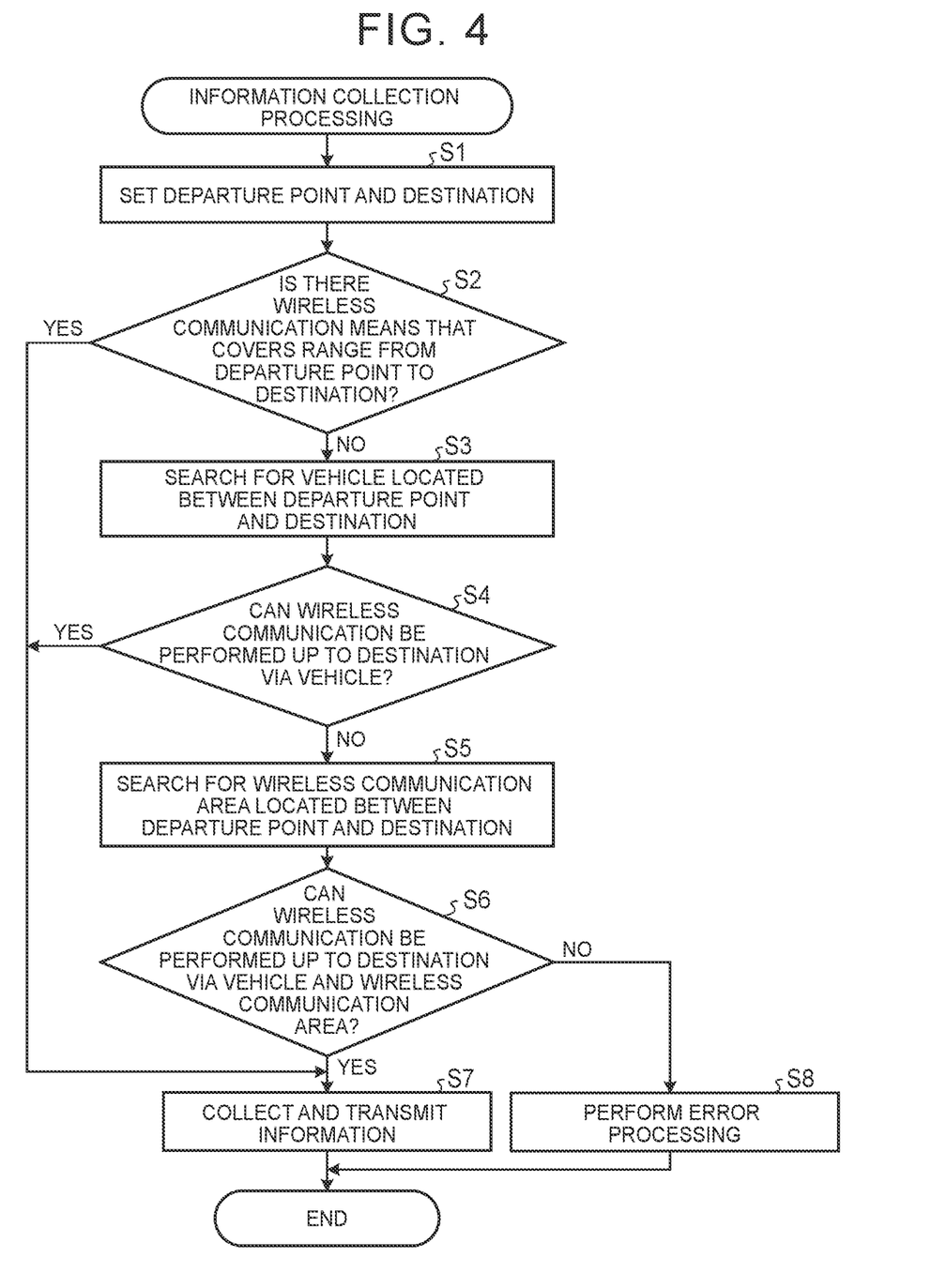
FIG. 4 is a flowchart showing a flow of information collection processing according to the one embodiment of the present disclosure.

FIG. 4 is a flowchart showing a flow of the information collection processing according to the one embodiment of the present disclosure. The information collection processing shown in FIG. 4 starts at a timing when an execution command for the information collection processing is input to the information collection device 4, and the information collection processing proceeds to the process of step S1. The operation of the control device 43 shown below is realized by loading the computer program stored in the main storage unit into the temporary storage unit and executing the loaded computer program.

In the process of step S1, the control device 43 sets information on the departure point of the small unmanned aerial vehicle 2 and the destination on which information is collected. The information on the departure point and the destination can be set, for example, by an operator operating the information collection device 4 to operate an input device and input the information. Further, as the information on the departure point and the destination, an address, information on the longitude and latitude, a facility name, etc. of the departure point and the destination can be exemplified. The operator may operate the small unmanned aerial vehicle 2 while watching the video transmitted from the small unmanned aerial vehicle 2 to cause the small unmanned aerial vehicle 2 to fly to the destination. With this operation, the process of step S1 is completed, and the information collection processing proceeds to the process of step S2.

In the process of step S2, the control device 43 determines whether wireless information communication can be performed with the small unmanned aerial vehicle 2 using the telecommunication line 3 from the departure point to the destination set in the process of step S1. When the wireless information communication can be performed with the small unmanned aerial vehicle 2 from the departure point to the destination as a result of the determination (step S2: Yes), the control device 43 advances the information collection processing to the process of step S7. On the other hand, when the wireless information communication can not be performed with the small unmanned aerial vehicle 2 from the departure point to the destination (step S2: No), the control device 43 advances the information collection processing to the process of step S3.

In the process of step S3, the control device 43 searches for a vehicle 5 located near a route from the departure point to the destination from among the vehicles 5 of which the identification information and the position information are stored in the vehicle information DB 44. For example, the control device 43 sets a route to the departure point and the destination, and searches for a vehicle 5 having the position information within a predetermined range from the position of the route. With this operation, the process of step S3 is completed, and the information collection processing proceeds to the process of step S4.

In the process of step S4, the control device 43 determines whether the wireless information communication can be performed with the small unmanned aerial vehicle 2 from the departure point to the destination set in the process of step S1 by sequentially using the vehicle 5 searched in the process of step S3. When the wireless information communication can be performed with the small unmanned aerial vehicle 2 from the departure point to the destination as a result of the determination (step S4: Yes), the control device 43 advances the information collection processing to the process of step S7. On the other hand, when the wireless information communication can not be performed with the small unmanned aerial vehicle 2 from the departure point to the destination (step S4: No), the control device 43 advances the information collection processing to the process of step S5.

In the process of step S5, the control device 43 searches for a wireless information communication network 6 that is available in an area where it is determined in the process of step S4 that the wireless information communication using the vehicle 5 cannot be performed from among the wireless information communication networks 6 in which information on the communicable area is stored in the communication area DB 45. With this operation, the process of step S5 is completed, and the information collection processing proceeds to the process of step S6.

In the process of step S6, the control device 43 determines whether the wireless information communication can be performed with the small unmanned aerial vehicle 2 from the departure point to the destination set in the process of step S1 using the vehicle 5 searched in the process of step S3 and the wireless information communication network 6 searched in the process of step S5. When the wireless information communication can be performed with the small unmanned aerial vehicle 2 from the departure point to the destination as a result of the determination (step S6: Yes), the control device 43 advances the information collection processing to the process of step S7. On the other hand, when the wireless information communication can not be performed with the small unmanned aerial vehicle 2 from the departure point to the destination (step S6: No), the control device 43 advances the information collection processing to the process of step S8.

In the process of step S7, the control device 43 transmits a control signal to the small unmanned aerial vehicle 2 by the wireless information communication, and the small unmanned aerial vehicle 2 flies from the departure point to the destination set in the process of step S1 in accordance with the received control signal. Then, the small unmanned aerial vehicle 2 collects various types of information at the destination in accordance with the control signal transmitted from the control device 43 by the wireless information communication, and transmits the collected information to the control device 43 by the wireless information communication. After that, the control device 43 distributes (transmits) the various types of information on the destination collected by the small unmanned aerial vehicle 2. With this operation, the process of step S7 is completed, and a series of information collection processing is completed.

In the process of step S8, the control device 43 determines that there is no wireless information communication means that covers the range from the departure point to the destination set in the process of step S1, and outputs an error message indicating that the information collection processing cannot be executed. With this operation, the process of step S8 is completed, and a series of information collection processing is completed.

As is clear from the above description, in the information providing system 1 according to the one embodiment of the present disclosure, when the wireless information communication can be executed with the small unmanned aerial vehicle 2 via the vehicle 5 located between the departure point and the destination, the information collection device 4 causes the small unmanned aerial vehicle 2 to fly from the departure point to the destination by transmitting the control signal to the small unmanned aerial vehicle 2 by the wireless information communication via the vehicle 5. As a result, even when there is no wireless information communication network that covers the range from the departure point to the destination due to factors such as a disaster, the information on the destination can be collected using the small unmanned aerial vehicle 2. When the vehicle 5 is movable from the departure point to the destination, the information collection device 4 may move the vehicle 5 from the departure point to the destination so as to continue the wireless information communication.

Figure 5:
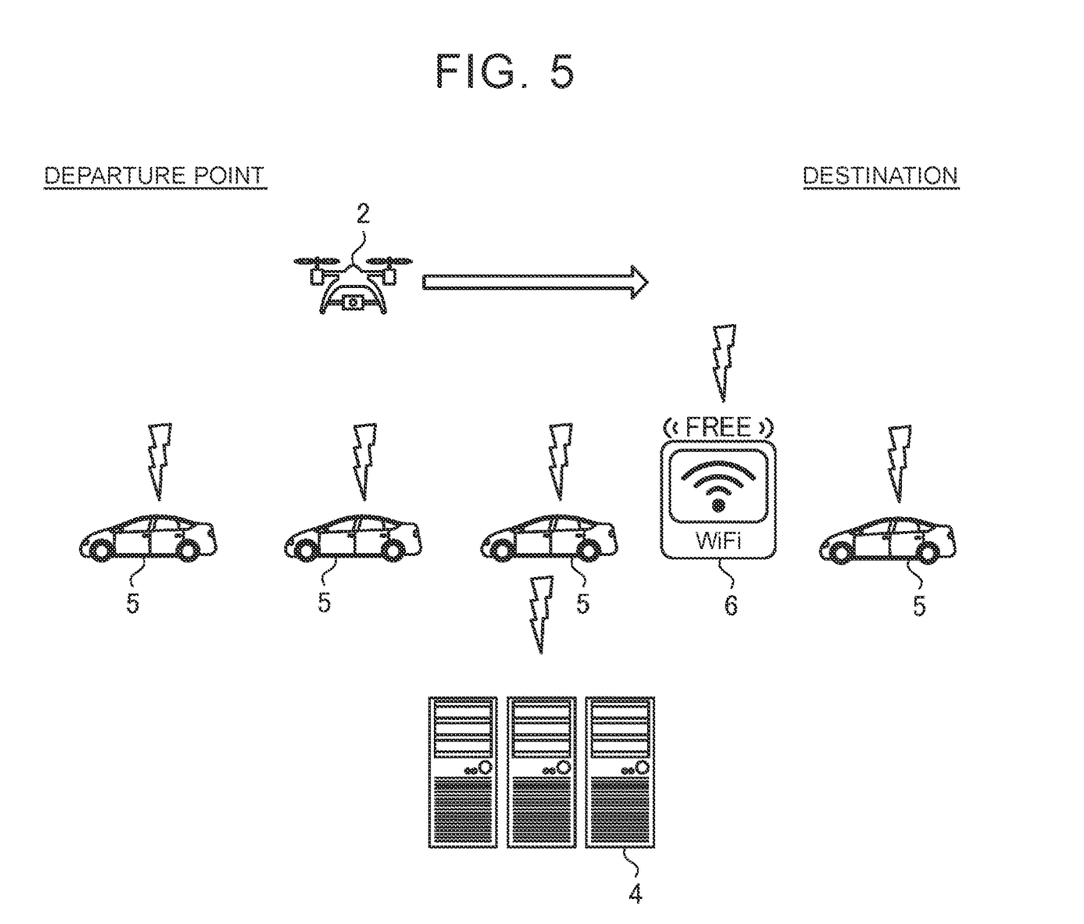
FIG. 5 is a schematic diagram for describing the information collection processing according to the one embodiment of the present disclosure.

Further, as shown in FIG. 5, when there is an area in which the wireless communication can not be executed via the vehicle 5 between the departure point and the destination, and the available wireless information communication network 6 is provided in the area, the information collection device 4 causes the small unmanned aerial vehicle 2 to fly from the departure point to the destination by transmitting the control signal to the small unmanned aerial vehicle 2 by the wireless information communication via the vehicle 5 and the wireless information communication network 6. Therefore, even when there is no wireless information communication network that covers the range from the departure point to the destination due to factors such as a disaster, the information on the destination can be collected using the small unmanned aerial vehicle 2. In general, since the frequency band of household WiFi (registered trademark) is not used immediately after a disaster, the frequency band thereof may be actively used. Further, the stability of the wireless information communication may be enhanced by limiting wireless communication in a frequency band close to the frequency band in use. In addition, when time has passed since the occurrence of the disaster, the household WiFi (registered trademark) is restored and the frequency band of the household WiFi (registered trademark) is congested. Therefore, after the time has passed since the occurrence of the disaster, the number of the small unmanned aerial vehicles 2 may be reduced such that wireless information communication is not interfered.

Further effects and modifications can be easily derived by those skilled in the art. The broader aspects of the present disclosure are not limited to the particular details and representative embodiments shown and described above. Accordingly, various modifications may be made without departing from the spirit or scope of the general concept of the disclosure defined by the appended claims and their equivalents.

What is claimed is:

1. An information collection device that causes a small unmanned aerial vehicle to fly from a departure point to a destination and collects information at the destination using the small unmanned aerial vehicle, the information collection device comprising:
a control device including a processor that that causes the small unmanned aerial vehicle to fly from the departure point to the destination by transmitting a control signal to the small unmanned aerial vehicle by wireless information communication via a vehicle located between the departure point and the destination when the wireless information communication is able to be executed with the small unmanned aerial vehicle via the vehicle, wherein when there is an area in which wireless communication is not able to be executed via the vehicle between the departure point and the destination, and an available wireless information communication network is provided in the area, the processor of the control device further causes the small unmanned aerial vehicle to fly from the departure point to the destination by transmitting the control signal to the small unmanned aerial vehicle by wireless information communication via the vehicle and the wireless information communication network;
wherein the processor of the control device further:
sets the information on the departure point and the destination by an operator operating the information collection device;
determines whether the wireless information communication is performed with the small unmanned aerial vehicle from the departure point to the destination using a telecommunication line;
searches for the vehicle from among a plurality of vehicles that is located within a predetermined range from a set route from the departure point to the destination; and
stores identification information of the available wireless communication network which is updated to a predetermined state at predetermined control cycles.

2. The information collection device according to claim 1, wherein when the wireless information communication network that covers the area between the departure point and the destination is available, the processor of the control device causes the small unmanned aerial vehicle to fly from the departure point to the destination by transmitting the control signal to the small unmanned aerial vehicle by wireless information communication via the wireless information communication network.

3. The information collection device according to claim 1, wherein when there is the area in which the control signal is not able to be transmitted to the small unmanned aerial vehicle by wireless information communication between the departure point and the destination, the processor of the control device prohibits flight of the small unmanned aerial vehicle.

4. The information collection device according to claim 1, wherein the processor of the control device distributes information collected by the small unmanned aerial vehicle via the telecommunication line.

5. The information collection device according to claim 1, wherein the destination is a disaster occurrence site.

6. The information collection device according to claim 5, wherein information collected by the small unmanned aerial vehicle includes a video of the disaster occurrence site and information on a victim.

7. An information collection method that causes a small unmanned aerial vehicle to fly from a departure point to a destination and collects information at the destination using the small unmanned aerial vehicle, the information collection method comprising:
a step of causing the small unmanned aerial vehicle to fly from the departure point to the destination by transmitting a control signal to the small unmanned aerial vehicle by wireless information communication via a vehicle located between the departure point and the destination when the wireless information communication is able to be executed with the small unmanned aerial vehicle via the vehicle;
when there is an area in which wireless communication is not able to be executed via the vehicle between the departure point and the destination, and an available wireless information communication network is provided in the area, a step of causing the small unmanned aerial vehicle to fly from the departure point to the destination by transmitting the control signal to the small unmanned aerial vehicle by wireless information communication via the vehicle and the wireless information communication network;

a step of setting the information on the departure point and the destination by an operator operating the information collection device;

a step of determining whether the wireless information communication is performed with the small unmanned aerial vehicle from the departure point to the destination using a telecommunication line;

a step of searching for the vehicle from among a plurality of vehicles that is located within a predetermined range from a set route from the departure point to the destination; and a step of storing identification information of the available wireless communication network which is updated to a predetermined state at predetermined control cycles.

8. The information collection method according to claim 7, further comprising when the wireless information communication network that covers the area between the departure point and the destination is available, a step of causing the small unmanned aerial vehicle to fly from the departure point to the destination by transmitting the control signal to the small unmanned aerial vehicle by wireless information communication via the wireless information communication network.

9. The information collection method according to claim 7, further comprising when there is the area in which the control signal is not able to be transmitted to the small unmanned aerial vehicle by wireless information communication between the departure point and the destination, a step of prohibiting flight of the small unmanned aerial vehicle.

10. The information collection method according to claim 7, further comprising a step of distributing information collected by the small unmanned aerial vehicle via the telecommunication line.

11. The information collection method according to claim 7, wherein the destination is a disaster occurrence site.

12. The information collection method according to claim 11, wherein information collected by the small unmanned aerial vehicle includes a video of the disaster occurrence site and information on a victim.

13. A non-transitory computer-readable medium comprising instructions that, when executed by a processor, cause the processor to perform one or more operations including:

causing a small unmanned aerial vehicle to fly from a departure point to a destination and collecting information at the destination using the small unmanned aerial vehicle;

causing the small unmanned aerial vehicle to fly from the departure point to the destination by transmitting a control signal to the small unmanned aerial vehicle by wireless information communication via a vehicle located between the departure point and the destination when the wireless information communication is able to be executed with the small unmanned aerial vehicle via the vehicle;

when there is an area in which wireless communication is not able to be executed via the vehicle between the departure point and the destination, and an available wireless information communication network is provided in the area, causing the small unmanned aerial vehicle to fly from the departure point to the destination by transmitting the control signal to the small unmanned aerial vehicle by wireless information communication via the vehicle and the wireless information communication network;

setting the information on the departure point and the destination by an operator operating the information collection device;

determining whether the wireless information communication is performed with the small unmanned aerial vehicle from the departure point to the destination using a telecommunication line;

searching for the vehicle from among a plurality of vehicles that is located within a predetermined range from a set route from the departure point to the destination; and storing identification information of the available wireless communication network which is updated to a predetermined state at predetermined control cycles.

14. The non-transitory computer-readable medium according to claim 13, wherein when a wireless information communication network that covers the area between the departure point and the destination is available, the one or more operations further including causing the small unmanned aerial vehicle to fly from the departure point to the destination by transmitting the control signal to the small unmanned aerial vehicle by wireless information communication via the wireless information communication network.

15. The non-transitory computer-readable medium according to claim 13, wherein when there is the area in which the control signal is not able to be transmitted to the small unmanned aerial vehicle by wireless information communication between the departure point and the destination, the one or more operations further including prohibiting flight of the small unmanned aerial vehicle.

16. The non-transitory computer-readable medium according to claim 13, wherein the the one or more operations further including distributing information collected by the small unmanned aerial vehicle via the telecommunication line.

17. The non-transitory computer-readable medium according to claim 13, wherein the destination is a disaster occurrence site.

* * * * *